United States Patent
Zhang

(10) Patent No.: US 9,521,266 B2
(45) Date of Patent: *Dec. 13, 2016

(54) CHARGING METHOD, AUTHENTICATION METHOD, CHARGING DEVICE, AND AUTHENTICATION DEVICE

(71) Applicant: Huawei Technologies Co., Ltd., Shenzhen (CN)

(72) Inventor: Yafeng Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,256

(22) Filed: Apr. 29, 2016

(65) Prior Publication Data

US 2016/0248915 A1 Aug. 25, 2016

Related U.S. Application Data

(63) Continuation of application No. 14/330,711, filed on Jul. 14, 2014, now Pat. No. 9,357,082, which is a (Continued)

(30) Foreign Application Priority Data

Mar. 5, 2012 (CN) .......................... 2012 1 0055094

(51) Int. Cl.
*H04M 15/00* (2006.01)
*H04L 12/14* (2006.01)

(52) U.S. Cl.
CPC .......... *H04M 15/43* (2013.01); *H04L 12/1403* (2013.01); *H04L 12/1435* (2013.01);
(Continued)

(58) Field of Classification Search
CPC .... H04M 15/43; H04M 15/62; H04M 15/851; H04M 15/853; H04M 15/854; H04L 12/1403; H04L 12/1435; H04L 12/1467; H04L 12/1485
See application file for complete search history.

(56) References Cited

U.S. PATENT DOCUMENTS 6,377,938 B1   4/2002   Block et al.
7,899,166 B1   3/2011   Ravindranath et al.
(Continued)

FOREIGN PATENT DOCUMENTS

CN   1464662 A    12/2003
CN   101170621 A   4/2008
(Continued)

OTHER PUBLICATIONS

Partial English Translation and Abstract of Chinese Patent Application No. CN101170621A, Aug. 27, 2014, 3 pages.
(Continued)

*Primary Examiner* — Barry Taylor
(74) *Attorney, Agent, or Firm* — Conley Rose, P.C.

(57) ABSTRACT

A charging method, an authentication method, a charging device, and an authentication device. The charging method includes receiving a service unit request sent by an access device, calculating a granted service unit according to a current tariff, determining a reporting time point according to a tariff switch point and returning a service unit answer to the access device; and receiving a used service unit reported by the access device at the reporting time point, calculating a remaining service unit based on the granted service unit and the used service unit instructing the access device to perform a forcible offline operation. The technical solutions provided by the embodiments of the present disclosure may effectively reduce an occurrence probability of a user account overdraft, thereby reducing a loss caused by the user account overdraft to an operator.

11 Claims, 8 Drawing Sheets

Related U.S. Application Data continuation of application No. PCT/CN2012/085307, filed on Nov. 27, 2012.

(52) U.S. Cl.
CPC ...... *H04L 12/1467* (2013.01); *H04L 12/1485* (2013.01); *H04M 15/62* (2013.01); *H04M 15/83* (2013.01); *H04M 15/85* (2013.01); *H04M 15/851* (2013.01); *H04M 15/853* (2013.01); *H04M 15/854* (2013.01); *H04M 15/887* (2013.01); *H04L 12/1496* (2013.01)

(56) References Cited

U.S. PATENT DOCUMENTS

| | | | |
|---|---|---|---|
| 9,357,082 B2* | 5/2016 | Zhang | H04L 12/1467 |
| 2002/0116338 A1 | 8/2002 | Gonthier et al. | |
| 2009/0210332 A1 | 8/2009 | Karlsson | |
| 2010/0128667 A1 | 5/2010 | Russell | |
| 2014/0242941 A1 | 8/2014 | Zhang | |
| 2014/0335820 A1 | 11/2014 | Zhang | |

FOREIGN PATENT DOCUMENTS

| | | |
|---|---|---|
| CN | 102340758 A | 2/2012 |
| CN | 102572768 A | 7/2012 |
| WO | 2006107248 A2 | 10/2006 |

OTHER PUBLICATIONS

Partial English Translation and Abstract of Chinese Patent Application No. CN102572768, Aug. 27, 2014, 10 pages.

Partial English Translation and Abstract of Chinese Patent Application No. CN1464662, Part 1, Aug. 27, 2014, 70 pages.

Partial English Translation and Abstract of Chinese Patent Application No. CN1464662, Part 2, Aug. 27, 2014, 9 pages.

Nokia, "Clarification of Tariff Time Change Handling," 3GPP TSG-SA5, Telecom Management, Meeting #40, Sanya, China, S5-044760, Nov. 15-19, 2004, 3 pages.

Rigney, C., et al., "Remote Authentication Dial in User Service (RADIUS), " RFC 2865, Jun. 2000, 76 pages.

Foreign Communication of a Counterpart Application, European Application No. 12870777.5, Extended European Search Report dated Sep. 19, 2014, 7 pages.

Foreign Communication From a Counterpart Application No. PCT/CN2012/085307, English Translation of International Search Report dated Mar. 7, 2013, 3 pages.

Foreign Communication From a Counterpart Application No. PCT/CN2012/085307, English Translation of Written Opinion dated Mar. 7, 2013, 11 pages.

Notice of Allowance dated Feb. 3, 2016, 21 pages, U.S. Appl. No. 14/330,711.

* cited by examiner

CHARGING METHOD, AUTHENTICATION METHOD, CHARGING DEVICE, AND AUTHENTICATION DEVICE

CROSS-REFERENCE TO RELATED APPLICATIONS

This application is a continuation of U.S. patent application Ser. No. 14/330,711, filed on Jul. 14, 2014, which is a continuation of International Application No. PCT/CN2012/085307, filed on Nov. 27, 2012. The International Application claims priority to Chinese Patent Application No. 201210055094.3, filed on Mar. 5, 2012. The afore-mentioned patent applications are hereby incorporated by reference in their entireties.

TECHNICAL FIELD

The present disclosure relates to a real-time charging technology, and in particular, to a charging method, an authentication method, a charging device, and an authentication device.

BACKGROUND

Development of a real-time charging technology creates good conditions for an operator to further segment a market. For example, the operator may define various monthly packages corresponding to different durations using the real-time charging technology, to satisfy requirements of various types of users. For another example, the operator may divide each day into different time segments according to network usage situations, and set different charging tariffs for different time segments. For example, a high tariff is set for a time segment during which a network is busy (for example, from 20 o'clock to 23 o'clock every day); and a low tariff is set and even no fee is charged for a time segment during which the network is idle (for example, from 6 o'clock to 8 o'clock every day).

However, a charging message reporting mechanism of the existing real-time charging technology still needs improvement, and therefore unexpected situations may occur in some cases. For example, as charging policies of an operator are increasingly complicated, the existing real-time charging technology may cause a user account overdraft in some cases, and therefore the operator is likely to suffer a loss. A reason for this phenomenon is described in the following with reference to FIG. 1.

FIG. 1 is a signaling diagram of an existing real-time charging method 100. In a scenario shown in FIG. 1, 18 o'clock is a tariff switch point, that is, a tariff is switched at 18 o'clock, where a tariff before the switch is 0 yuan/million (M), that is, no fee is charged before the switch; and a tariff after the switch is 1 yuan/M. A user sends a login request to an access device at seventeen fifty-one when an account balance of the user is 10 yuan.

Step 102: The access device sends an access request to an authentication device in response to the login request of the user, so as to request a granted service unit for the user.

Step 104: The authentication device sends an initial credit control request (CCR {Init}) to a charging device, where the initial credit control request carries a requested service unit (RSU) of 100 M.

Then, the charging device determines a current available service unit according to a current account balance of the user and a current tariff. Because the user's current account balance is 10 yuan, according to the current tariff of 0 yuan/M, the current available service unit is infinite. That is, the user is able to use a service unrestrictedly until the end of a free time segment.

Step 106: The charging device sends an initial credit control answer (CCA {Init}) to the authentication device. Because the determined current available service unit is infinite, which is greater than the requested service unit of 100 M, a granted service unit (GSU) carried in the CCA {Init} is set to be the requested service unit of 100 M according to existing real-time charging technical specifications.

Step 108: The authentication device determines that the granted service unit of 100 M carried in the CCA {Init} is the requested service unit of 100 M, and therefore grants the entire service unit of 100 M to the user. Further, the authentication device sends an access response to the access device. The access response carries parameters VT=90 M and VQ=100 M, where VT is a volume threshold and VQ is a volume quota. VQ=100 M indicates that the granted service unit is 100 M, and VT=90 M indicates that the access device needs to request a granted service unit again for the user when detecting that a used service unit of the user reaches 90 M.

In addition, the access response further includes a tariff switch interval (TSI), which is used to indicate a time interval between a current moment and the tariff switch point, so as to prompt the access device to separately report used service units which are generated before and after the tariff switch point, respectively. TSI=540 s indicates that the interval between the current moment and the tariff switch point is 540 seconds.

Step 110: When the used service unit of the user reaches 90 M, the access device sends an online access request to the authentication device, where the online access request carries the used service unit of 90 M (the used service unit is also carried in the VQ parameter), and indicates that a used service unit after the tariff switch point of 18 o'clock is 40 M in the used service unit of 90 M, that is, a volume used after tariff switch (VUATS) is 40 M.

Step 112: The authentication device notifies the charging device of the foregoing used service units using an update credit control request (CCR {Update}), where the foregoing used service units are carried in a USU (used service unit). Because the tariff is switched, two USUs are reported simultaneously according to existing technical specifications related to real-time charging, where a USU (TCU=2) represents a total used service unit, namely, 90 M, in a latest charging period, a USU (TCU=1) represents the used service unit after the tariff switch, namely, 40 M, in the latest charging period, and TCU stands for tariff change usage identifier.

Then, the charging device performs fee deduction according to the foregoing used service units. A used service unit generated before 18 o'clock is 50 M (90 M−40 M), and a fee of 0 yuan is generated according to the tariff of 0 yuan/M before 18 o'clock; and a service unit generated after 18 o'clock is 40 M, and a fee of 40 yuan is generated according to the tariff of 1 yuan/M after 18 o'clock. Therefore, 40 yuan is deducted totally. Because the previous user account balance is 10 yuan, a user account balance after fee deduction is −30 yuan, and the user account is overdrawn. Therefore, the available service unit of the user is zero.

Step 114: The charging device calculates a granted service unit according to the user account balance after fee deduction. Because the user account is overdrawn, the calculated granted service unit is 0. The charging device returns an update credit control answer (CCA {Update}) to the authentication device, where a carried GSU is 0 M, namely, the granted service unit is 0.

Step 116: The authentication device returns an online access response to the access device, and notifies the access device that the granted service unit is zero.

When the access device reports the used service unit of 90 M in step 110, among the service unit of 100 M previously granted by the charging device to the user, there are still 10 M (100 M–90 M) left. In some existing real-time charging technical solutions, although the user account is overdrawn, and the available service unit of the user is zero, the access device still permits the user to continue to use up the remaining granted service unit of 10 M, and after the remaining service unit is used up, instructs the charging device to charge for the remaining granted service unit. Therefore, in step 118, the access device reports a stop online access request (Online Access Request (stop)) to the authentication device, and reports the used service unit of 10 M, where the used service unit is carried in the VQ parameter.

Step 120: The authentication device reports a terminate credit control request (CCR {Term}) to the charging device according to the stop online access request from the access device, where the used service unit of 10 M is carried in the USU parameter.

Step 122: The charging device performs fee deduction for the user account according to the used service unit carried in the terminate credit control request sent by the authentication device, and then returns a terminate credit control answer (CCA {Term}) to the authentication device. Because the user account is overdrawn previously, an overdraft of the user account further increases after this fee deduction.

Step 124: The authentication device returns a stop online access response (stop) to the access device according to the terminate credit control answer from the charging device.

It is not that hard to find out from the foregoing process that the user has used a service unit of 50 M when the tariff switch point (18 o'clock) is reached, and that a service usage fee of the user is 0 yuan according to the tariff of 0 yuan/M before 18 o'clock. Therefore, the user account balance is still 10 yuan at 18 o'clock. According to the tariff after 18 o'clock (1 yuan/M), a service unit available to the user based on the user account balance after 18 o'clock is only 10 M. However, in an actual using process, the user uses a service unit of 40 M within just three minutes from 18 o'clock to three past eighteen, and the service unit is far more than the service unit of 10 M available to the user based on the user account balance, therefore causing an overdraft of 30 yuan in the user account. In addition, a subsequent practice that the access device permits the user to continue to use up the remaining granted service unit may further increase the overdraft, which probably causes a certain loss to the operator.

SUMMARY

In view of this, it is necessary to provide a charging method for reducing an occurrence probability of a user account overdraft.

In addition, an authentication method is provided, for reducing an occurrence probability of a user account overdraft.

In addition, a charging method is provided, for reducing an occurrence probability of a user account overdraft.

In addition, a charging device is provided, for reducing an occurrence probability of a user account overdraft.

In addition, an authentication device is provided, for reducing an occurrence probability of a user account overdraft.

In addition, a charging device is provided, for reducing an occurrence probability of a user account overdraft.

According to an aspect of the present disclosure, a charging method is provided and includes: receiving a service unit request sent by an access device; calculating a granted service unit according to a current tariff; determining a reporting time point according to a tariff switch point when an overdraft monitoring condition is met according to the granted service unit and a tariff after the tariff switch point; and returning a service unit answer, which carries the granted service unit and the reporting time point, to the access device; and receiving a used service unit reported by the access device at the reporting time point; calculating a remaining service unit based on the granted service unit and the used service unit; and when the remaining service unit will cause an overdraft, instructing the access device to perform a forcible offline operation.

According to another aspect of the present disclosure, a charging method is provided and includes: receiving a service unit request sent by an access device through an authentication device; calculating a granted service unit according to a current tariff; and when an overdraft monitoring condition is met according to the granted service unit and a tariff after a tariff switch point, returning a service unit answer, which carries the granted service unit and a reporting time point that is determined according to the tariff switch point, to the access device through the authentication device; and receiving a used service unit reported by the access device through the authentication device at the reporting time point; calculating a remaining service unit based on the granted service unit and the used service unit; and when the remaining service unit will cause an overdraft, instructing, through the authentication device, the access device to perform a forcible offline operation.

According to yet another aspect of the present disclosure, an authentication method is provided and includes: receiving an access request sent by an access device, and sending a service unit request to a charging device; receiving a service unit answer that is returned by the charging device and carries a granted service unit; and when the service unit answer carries an overdraft monitoring indication, returning an access response, which carries the granted service unit and a reporting time point that is determined according to a tariff switch point, to the access device; receiving a used service unit reported by the access device at the reporting time point, and reporting the used service unit to the charging device; and receiving a forcible offline instruction returned by the charging device, and instructing the access device to perform a forcible offline operation.

According to still another aspect of the present disclosure, a charging device is provided and includes: an overdraft monitoring module configured to receive a service unit request sent by an access device; calculate a granted service unit according to a current tariff; determine a reporting time point according to a tariff switch point when an overdraft monitoring condition is met according to the granted service unit and a tariff after the tariff switch point; and return a service unit answer, which carries the granted service unit and the reporting time point, to the access device; and a forcible offline instructing module configured to receive a used service unit reported by the access device at the reporting time point; calculate a remaining service unit based on the granted service unit and the used service unit;

and when the remaining service unit will cause an overdraft, instruct the access device to perform a forcible offline operation.

According to an aspect of the present disclosure, a charging device is provided and includes: an overdraft monitoring module configured to receive a service unit request sent by an access device through an authentication device; calculate a granted service unit according to a current tariff; and when an overdraft monitoring condition is met according to the granted service unit and a tariff after a tariff switch point, return a service unit answer, which carries the granted service unit and a reporting time point that is determined according to the tariff switch point, to the access device through the authentication device; and a forcible offline instructing module configured to receive a used service unit reported by the access device through the authentication device at the reporting time point; calculate a remaining service unit based on the granted service unit and the used service unit; and when the remaining service unit will cause an overdraft, instruct, through the authentication device, the access device to perform a forcible offline operation.

According to another aspect of the present disclosure, an authentication device is provided and includes: a request forwarding module configured to receive an access request sent by an access device, and send a service unit request to a charging device; a determining and processing module configured to receive a service unit answer that is returned by the charging device and carries a granted service unit; and when the service unit answer carries an overdraft monitoring indication, return an access response, which carries the granted service unit and a reporting time point that is determined according to a tariff switch point, to the access device; a used service unit forwarding module configured to receive a used service unit reported by the access device at the reporting time point, and report the used service unit to the charging device; and a forcible offline instructing module configured to receive a forcible offline instruction returned by the charging device, and instruct the access device to perform a forcible offline operation.

According to technical solutions provided by embodiments of the present disclosure, when determining that a user account is likely to be overdrawn after a tariff switch point, a charging device instructs an access device to report a used service unit in time after the tariff switch point, and when determining that a remaining service unit that has not been used by a user may cause the user account to be overdrawn, the charging device instructs the access device to force the user to go offline. Therefore, the technical solutions provided by the embodiments of the present disclosure may effectively reduce an occurrence probability of a user account overdraft, thereby reducing a loss caused by the user account overdraft to an operator.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
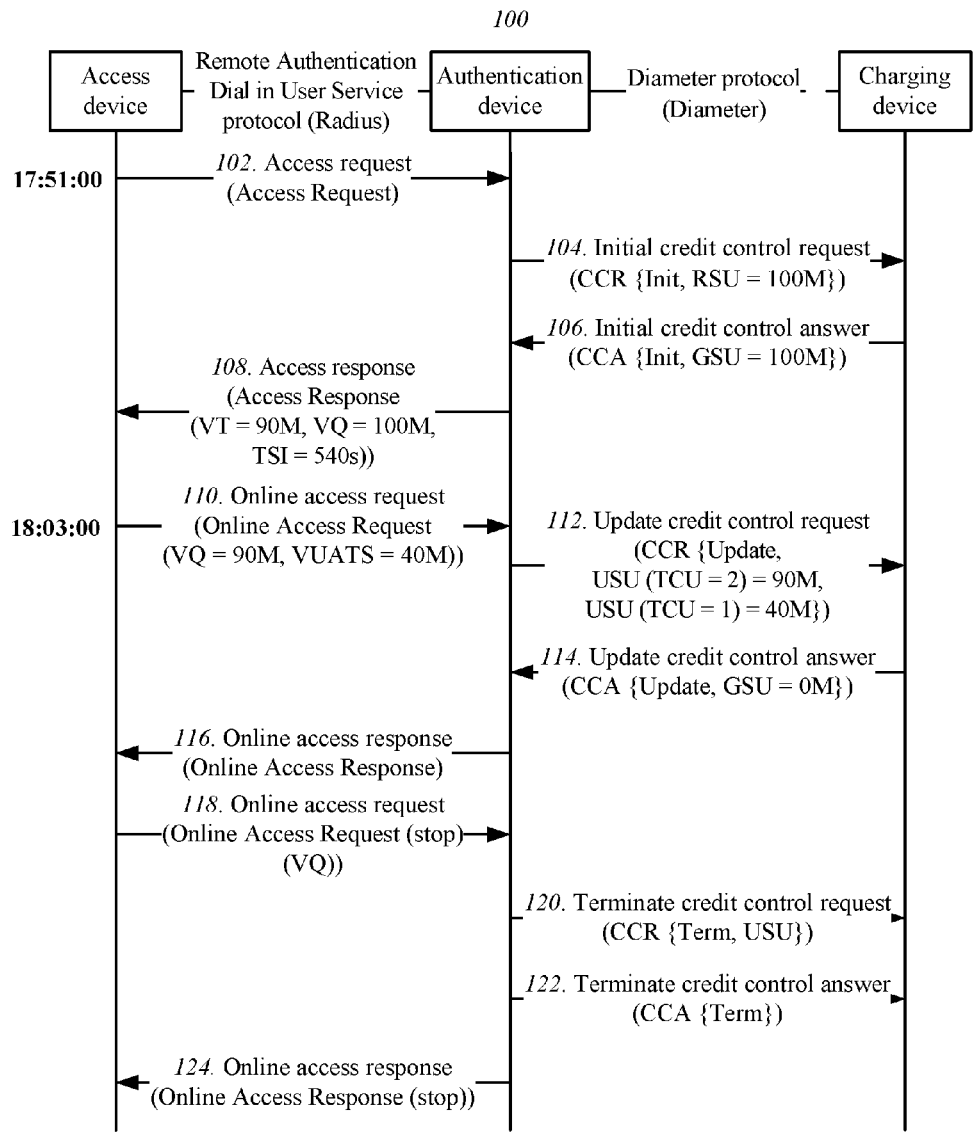
FIG. 1 is a signaling diagram of an existing real-time charging method.
Figure 2:
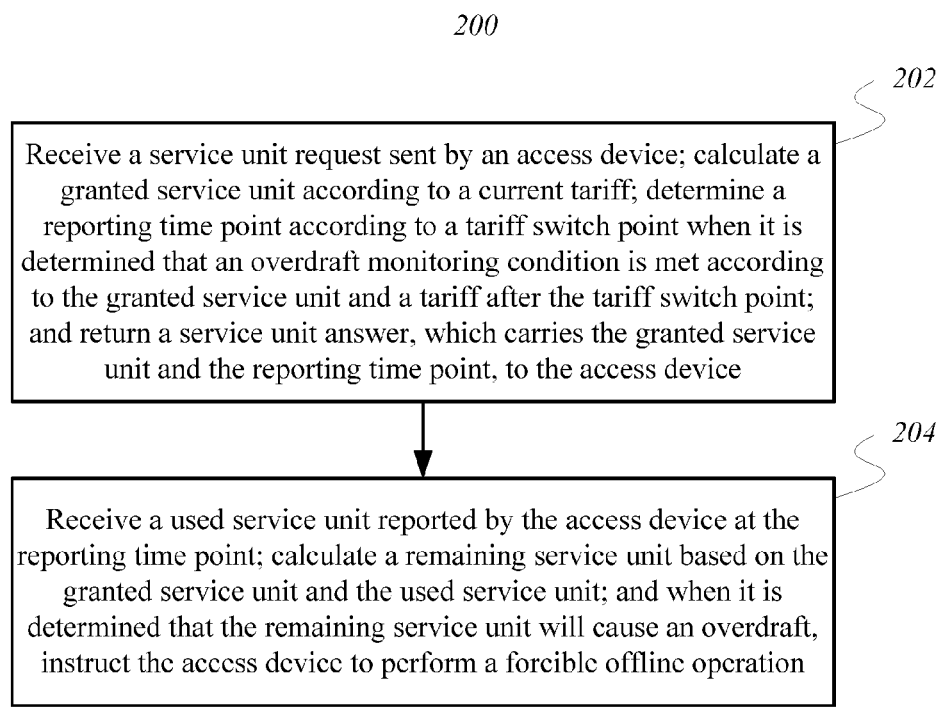
FIG. 2 is an exemplary flowchart of a charging method according to an embodiment of the present disclosure.

FIG. 2 is an exemplary flowchart of a charging method 200 according to an embodiment of the present disclosure. In a specific implementation process, the charging method 200 may be executed by, such as, but not limited to, a charging device. The charging device may be, such as, but not limited to, a pre-paid server (PPS). Further, the pre-paid server may be, for example, but not limited to, an online charging system (OCS).

Step 202: Receive a service unit request sent by an access device; calculate a granted service unit according to a current tariff; determine a reporting time point according to a tariff switch point when an overdraft monitoring condition is met according to the granted service unit and a tariff after the tariff switch point; and return a service unit answer, which carries the granted service unit and the reporting time point, to the access device.

In a specific implementation process, when the method is applied to a Worldwide Interoperability for Microwave Access (WiMAX) network, the foregoing access device may be an access service network-gateway (ASN-GW)/home agent (HA) deployed in the WiMAX network; and when the method is applied to a Code Division Multiple Access (CDMA) network, the foregoing access device may be a packet data serving node (PDSN)/HA deployed in the CDMA network.

In a specific implementation process, the foregoing overdraft monitoring condition may be: Tariff after the tariff switch point×Granted service unit>Current account balance.

Optionally, the foregoing overdraft monitoring condition may further be:

(Granted service unit−Preset maximum access speed×Time interval between a current moment and the tariff switch point)×Tariff after the tariff switch point+Preset maximum access speed×Time interval between the current moment and the tariff switch point×Current tariff>Current account balance.

The foregoing preset maximum access speed may be set according to a highest speed that can be provided by a communications network, and may also be set according to a highest speed permitted by a service or a package selected by a user.

In addition, optionally, the foregoing overdraft monitoring condition may further be that a tariff before the tariff switch point is lower than the tariff after the tariff switch point.

It should be noted that, the foregoing condition is only used as an example. A person skilled in the art should understand that, in a specific implementation process, another condition may further be set according to specific requirements.

In a specific implementation process, the foregoing reporting time point is used to instruct the access device to report a used service unit at the reporting time point. The reporting time point may be the tariff switch point. Therefore, the determining a reporting time point according to a tariff switch point includes assigning the tariff switch point to the reporting time point.

Optionally, the determining a reporting time point according to a tariff switch point includes: calculating a delay duration; and calculating the reporting time point according to the following formula: Reporting time point=Tariff switch point+Delay duration.

If the foregoing preset delay duration is set to a fixed value, a large number of used service units may be reported at a same moment after the tariff switch point, which brings serious burden to a related device such as the charging device. In order to solve this problem, a random delay duration may be calculated using for example, but not limited to, a random algorithm, so that the used service units may be reported at different moments after the tariff switch point, thereby effectively reducing impact on a processing device when a large number of used service units are reported. It should be noted that, a person skilled in the art should understand that an overdraft occurrence probability will be lower when the foregoing preset delay duration is shorter. In view of above, the foregoing calculating a delay duration includes calculating a random number based on a preset random algorithm and using the random number as the delay duration.

It should be noted that, a person skilled in the art should understand that the current tariff is the tariff before the tariff switch point.

Actually, an objective of executing step 202 lies in determining in advance a possibility that a user account is overdrawn after the tariff switch point. When the user account is likely to be overdrawn after the tariff switch point, the access device is instructed to report a used service unit in time at the reporting time point after the tariff switch point.

Step 204: Receive a used service unit reported by the access device at the reporting time point; calculate a remaining service unit based on the granted service unit and the used service unit; and when the remaining service unit will cause an overdraft, instruct the access device to perform a forcible offline operation.

In a specific implementation process, when receiving the used service unit reported by the access device at the reporting time point, the charging device may first perform fee deduction for a user account according to the used service unit. Then, if a product of the tariff after the tariff switch point and the remaining service unit exceeds a user account balance after fee deduction, it indicates that the user account will be overdrawn after the user uses up the remaining service unit. In this case, in step 204, when determining that the remaining service unit will cause an overdraft, the charging device instructs the access device to perform a forcible offline operation, so as to prevent the user account from being overdrawn.

Actually, an objective of executing step 204 lies in instructing the access device to force the user to go offline when the remaining service unit that has not been used by the user may cause the user account to be overdrawn, so as to prevent the user account from being overdrawn.

As known from the method 200, according to the technical solution provided by the embodiment of the present disclosure, when determining that the user account is likely to be overdrawn after the tariff switch point, the charging device instructs the access device to report the used service unit in time after the tariff switch point, and when determining that the remaining service unit that has not been used by the user may cause the user account to be overdrawn, the charging device instructs the access device to force the user to go offline. Therefore, the technical solution provided by the embodiment of the present disclosure may effectively reduce an occurrence probability of a user account overdraft, thereby reducing a loss caused by the user account overdraft to an operator. In addition, as known from the technical solution provided by the embodiment of the present disclosure, only the charging device needs to be modified, the access device does not need to be upgraded, and therefore an implementation cost is low.

Figure 3:
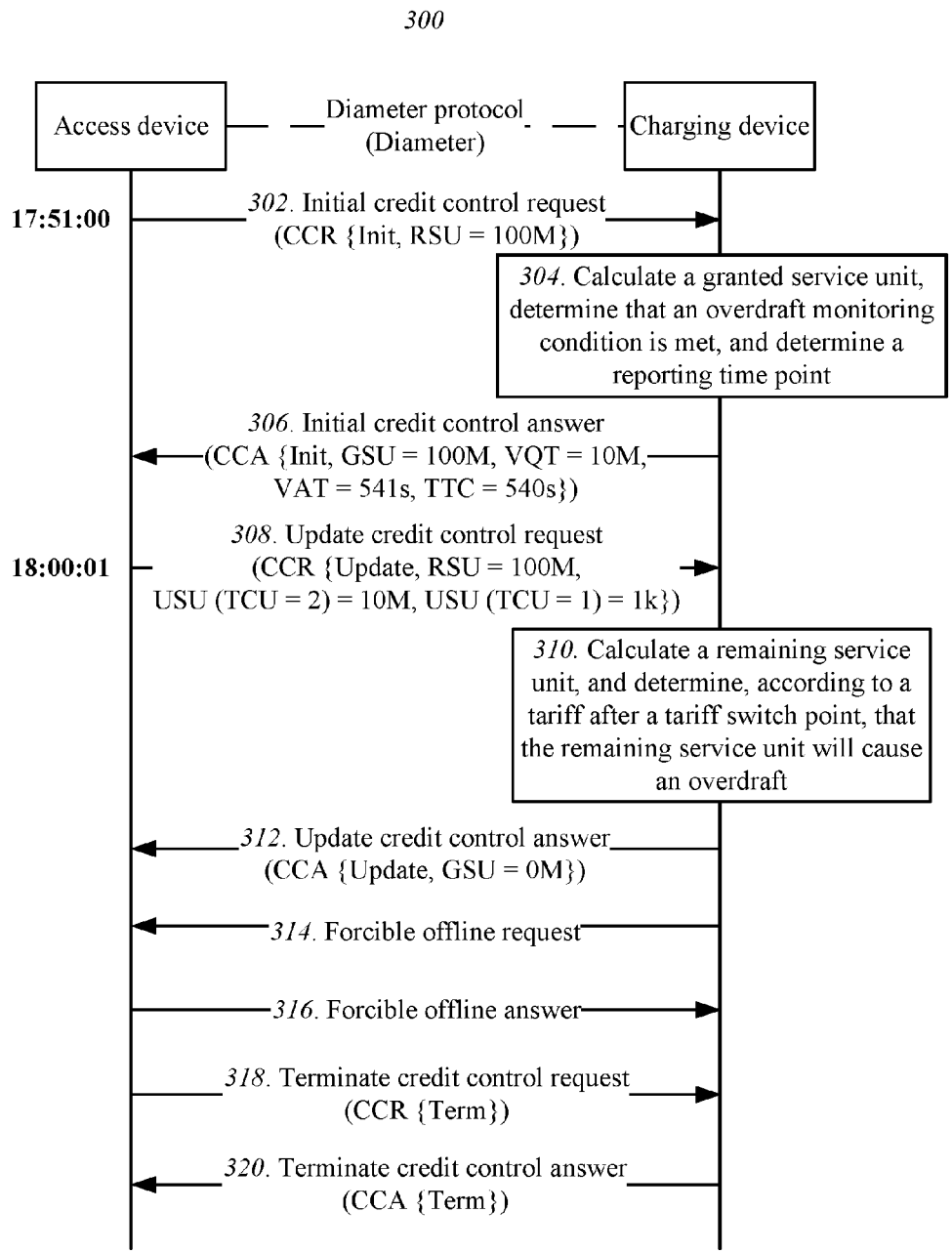
FIG. 3 is an exemplary signaling diagram of a charging method according to an embodiment of the present disclosure.

FIG. 3 is an exemplary signaling diagram of a charging method 300 according to an embodiment of the present disclosure. In the embodiment, an access device communicates with a charging device according to the Diameter protocol. In addition, in the embodiment, 18 o'clock is a tariff switch point. That is, a tariff is switched at 18 o'clock, where a tariff before the switch is 0 yuan/M, that is, no fee is charged before the switch, and a tariff after the switch is 1 yuan/M. In the embodiment, an overdraft monitoring condition is: Tariff after the tariff switch point×Granted service unit>Current account balance. In addition, in the embodiment, a reporting time point is calculated using a solution of calculating a delay duration and using a formula: Reporting time point=Tariff switch point+Delay duration.

A user sends a login request to the access device at seventeen fifty-one, namely, 17:51:00, and a user account balance is 10 yuan at this time.

Step 302: The access device sends a CCR {Init} to the charging device, where the initial credit control request carries a RSU of 100 M. The initial credit control request is the service unit request in step 202 in FIG. 2.

Step 304: The charging device determines a granted service unit according to a current account balance of the user and a current tariff. Because the current account balance of the user is 10 yuan and the current tariff is 0 yuan/M, a current available service unit is infinite. That is, the user may use a service unrestrictedly until the end of a free time segment. As described above, in this case, the granted service unit is set to be the service unit requested by the access device, namely, the RSU of 100 M carried in the initial credit control request.

After the granted service unit is determined, in step 304, the charging device continues to determine whether the overdraft monitoring condition is met. As described above, in the embodiment, the overdraft monitoring condition is: Tariff after the tariff switch point×Granted service unit>Current account balance. Because the tariff after the tariff switch point is 1 yuan/M and the granted service unit is 100 M, a product of the tariff after the tariff switch point and the granted service unit is equal to 100 yuan, which is far more than the current account balance of 10 yuan. Therefore, the charging device determines that the overdraft monitoring condition is met.

Because the overdraft monitoring condition is met, according to the technical solution provided by the embodiment of the present disclosure, the charging device needs to return a reporting time point to the access device. As described above, in the embodiment, the reporting time point is calculated using the solution of calculating a delay duration and using the formula: Reporting time point=Tariff switch point+Delay duration. In this case, it is assumed that a delay duration calculated using a random algorithm is one second, and therefore the reporting time point determined by the charging device is 18:00:01.

Step 306: The charging device sends a CCA {Init} to the access device, so that the access device authorizes the user to use a service and monitors a used service unit of the user. As shown in FIG. 3, the initial credit control answer carries the GSU of 100 M and a volume threshold (Volume Quota Threshold (VQT)) of 10 M, where the VQT is used to instruct the access device to request the charging device to deliver a granted service unit to the user again when there is 10 M left in the granted service unit (that is, the used service unit of the user reaches 90 M).

In addition, the initial credit control answer further carries a TTC parameter. The TTC parameter is a tariff time change, and is used to indicate a time interval between a current moment and the tariff switch point, so as to prompt the access device to separately report used service units which are generated before and after the tariff switch point, respectively. TSI=540 s indicates that the interval between the current moment and the tariff switch point (a time loss in a process of transferring and processing a message is ignored) is 540 seconds.

In addition, in the embodiment, a Validity-Time (VAT) parameter is carried in the CCA {Init} to indicate the reporting time point to the access device. According to existing technical specifications related to real-time charging, if an allocated granted service unit is not used up within the validity time indicated by the VAT, the access device must request a granted service unit from the charging device again for the user. In this case, the access device may report the used service unit to the charging device when requesting a granted service unit again for the user. Because the reporting time point determined in the embodiment is 18:00:01, and the time interval between the current moment and the tariff switch point of 18 o'clock is 540 seconds, the VAT parameter is set to 541 (540+1) seconds.

The initial credit control answer is the service unit request in step 202 in FIG. 2.

Step 308: When the access device authorizes the user to use a service and detects that one second after the tariff switch point of 18 o'clock, namely, 18:00:01, is reached, the access device notifies the charging device of the used service units using a CCR {Update}, where the foregoing used service units are carried in a USU field. Because the tariff is switched, according to the existing technical specifications related to real-time charging, the access device reports two USUs simultaneously, where a USU (TCU=2) represents a total used service unit, namely, 10 M, in a latest charging period, and a USU (TCU=1) represents the used service unit after the tariff switch, namely, 1,000 (1 k), in the latest charging period. In addition, the update credit control request still carries the RSU of 100 M.

Step 310: After receiving the update credit control request from the access device, the charging device calculates and obtains a remaining service unit of 90 M (100 M–10 M) according to the previous granted service unit of 100 M and the used service unit of 10 M carried in the update credit control request.

In addition, the charging device performs charging according to the used service units carried in the CCR {Update}. Further, a used service unit generated before 18 o'clock is 10 M–1 k, and a fee of 0 yuan is generated according to the tariff of 0 yuan/M before 18 o'clock; a service unit generated after 18 o'clock is 1 k, a fee of $1/1024$ yuan is generated according to the tariff of 1 yuan/M after 18 o'clock, and therefore a user account balance after fee deduction is $10-1/1024$ yuan, which is about 10 yuan.

Then, according to the remaining service unit, the user account balance after fee deduction, and the current tariff, the charging device determines whether the remaining service unit will cause an overdraft. Because the remaining service unit is 90 M and the current tariff is 1 yuan/M, the user needs to pay 90 yuan (90 M×1 yuan/M) in total for using all the remaining service unit, and 90 yuan is far more than the user account balance after fee deduction (about 10 yuan). Therefore, the charging device determines that the remaining service unit will cause an overdraft.

Step 312: The charging device returns a CCA {Update} to the access device, where a carried GSU is 0 M.

Step 314: To prevent the access device from permitting the user to continue using the remaining service unit of 90 M, the charging device sends a forcible offline request to the access device, so as to instruct the access device to force the user to go offline, that is, to perform a forcible offline operation. In the embodiment, the forcible offline request is an abort session request (ASR).

Step 316: According to the forcible offline request from the charging device, the access device forces the user to go offline, and then returns a forcible offline answer to the charging device, which notifies the charging device that the user has been forced to go offline. In the embodiment, the forcible offline answer is an abort session answer (ASA).

The user still uses a service during a process from step 308 in which the access device reports the used service units to step 316 in which the access device forces the user to go offline, and therefore a used service unit is generated inevitably. Although this used service unit is small, it is still necessary to charge for this used service unit. Therefore, in step 318, the access device reports a CCR {Term} to the charging device, where the used service unit is carried in the USU parameter.

Step 320: The charging device performs fee deduction for the user account according to the used service unit carried in the terminate credit control request sent by the access device, and then returns a CCA {Term} to the access device.

Figure 4:
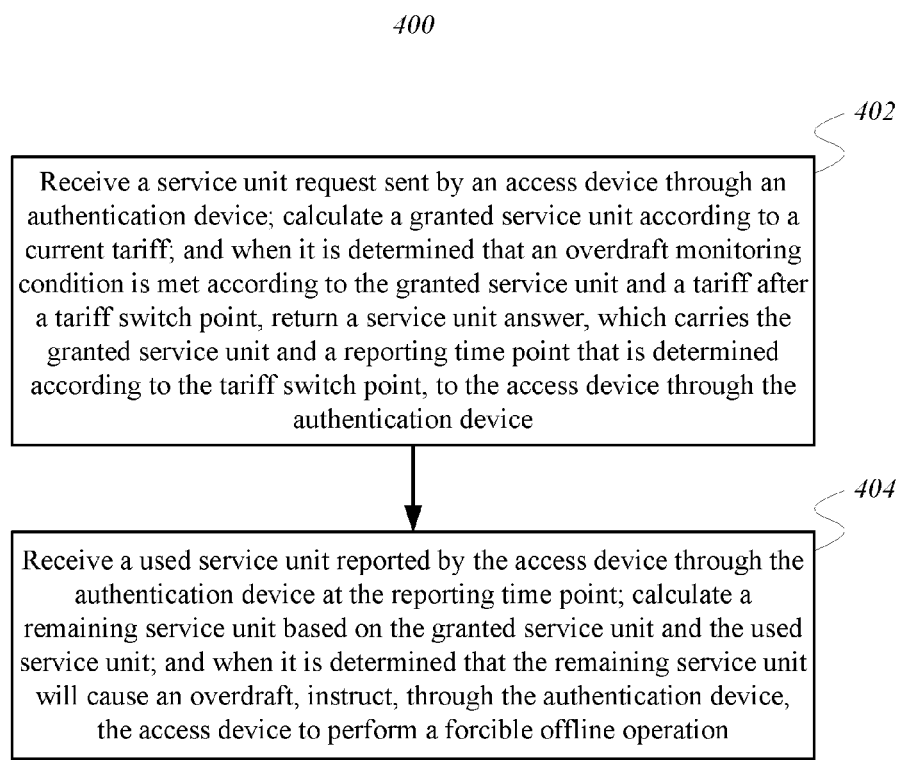
FIG. 4 is an exemplary flowchart of a charging method according to an embodiment of the present disclosure.

FIG. 4 is an exemplary flowchart of a charging method 400 according to an embodiment of the present disclosure. In a specific implementation process, the charging method 400 may be executed by, such as, but not limited to, a charging device. The charging device may be, such as, but not limited to, a PPS. Further, the pre-paid server may be, for example, but not limited to, an OCS.

Step 402: Receive a service unit request sent by an access device through an authentication device; calculate a granted service unit according to a current tariff; and when an overdraft monitoring condition is met according to the granted service unit and a tariff after a tariff switch point, return a service unit answer, which carries the granted service unit and a reporting time point that is determined according to the tariff switch point, to the access device through the authentication device.

In a specific implementation process, when the method is applied to a WiMAX network, the foregoing access device may be an ASN-GW/HA deployed in the WiMAX network; and when the method is applied to a CDMA network, the foregoing access device may be a PDSN/HA deployed in the CDMA network. The foregoing authentication device may be, such as, but not limited to, an Authentication, Authorization and Accounting (AAA) server.

In a specific implementation process, the returning a service unit answer, which carries the granted service unit and a reporting time point that is determined according to the tariff switch point, to the access device through the authentication device includes: determining the reporting time point according to the tariff switch point; and returning the service unit answer, which carries the granted service unit and the reporting time point, to the access device through the authentication device. In this case, the charging device determines the reporting time point.

Optionally, in a specific implementation process, the returning a service unit answer, which carries the granted service unit and a reporting time point that is determined according to the tariff switch point, to the access device through the authentication device includes: instructing the authentication device to determine the reporting time point according to the tariff switch point; and instructing the authentication device to return the service unit answer, which carries the granted service unit and the reporting time point, to the access device. In this case, the authentication device determines the reporting time point.

In a specific implementation process, the foregoing overdraft monitoring condition may be: Tariff after the tariff switch point×Granted service unit>Current account balance.

Optionally, the foregoing overdraft monitoring condition may further be: (Granted service unit−Preset maximum access speed×Time interval between a current moment and the tariff switch point)×Tariff after the tariff switch point+Preset maximum access speed×Time interval between the current moment and the tariff switch point×Current tariff>Current account balance.

The foregoing preset maximum access speed may be set according to a highest speed that can be provided by a communications network, and may also be set according to a highest speed permitted by a service or a package selected by a user.

In addition, optionally, the foregoing overdraft monitoring condition may further be that a tariff before the tariff switch point is lower than the tariff after the tariff switch point.

It should be noted that, the foregoing condition is only used as an example. A person skilled in the art should understand that, in a specific implementation process, another condition may further be set according to specific requirements.

In a specific implementation process, the foregoing reporting time point may be the tariff switch point. Therefore, when determining the reporting time point according to the tariff switch point, the charging device or the authentication device may assign the tariff switch point to the reporting time point.

Optionally, the charging device or the authentication device may further determine the reporting time point using the following method: calculating a delay duration; and calculating the reporting time point according to the following formula: Reporting time point=Tariff switch point+Delay duration.

Step 404: Receive a used service unit reported by the access device through the authentication device at the reporting time point; calculate a remaining service unit based on the granted service unit and the used service unit; and when the remaining service unit will cause an overdraft, instruct, through the authentication device, the access device to perform a forcible offline operation.

In a specific implementation process, when receiving the used service unit reported by the access device through the authentication device, the charging device may first perform fee deduction for the user account according to the used service unit. Then, if a product of the tariff after the tariff switch point and the remaining service unit exceeds a user account balance after fee deduction, it indicates that the user account will be overdrawn after a user uses up the remaining service unit. In this case, in step 404, when determining that the remaining service unit will cause an overdraft, the charging device instructs, through the authentication device, the access device to perform the forcible offline operation, so as to prevent the user account from being overdrawn.

Figure 5:
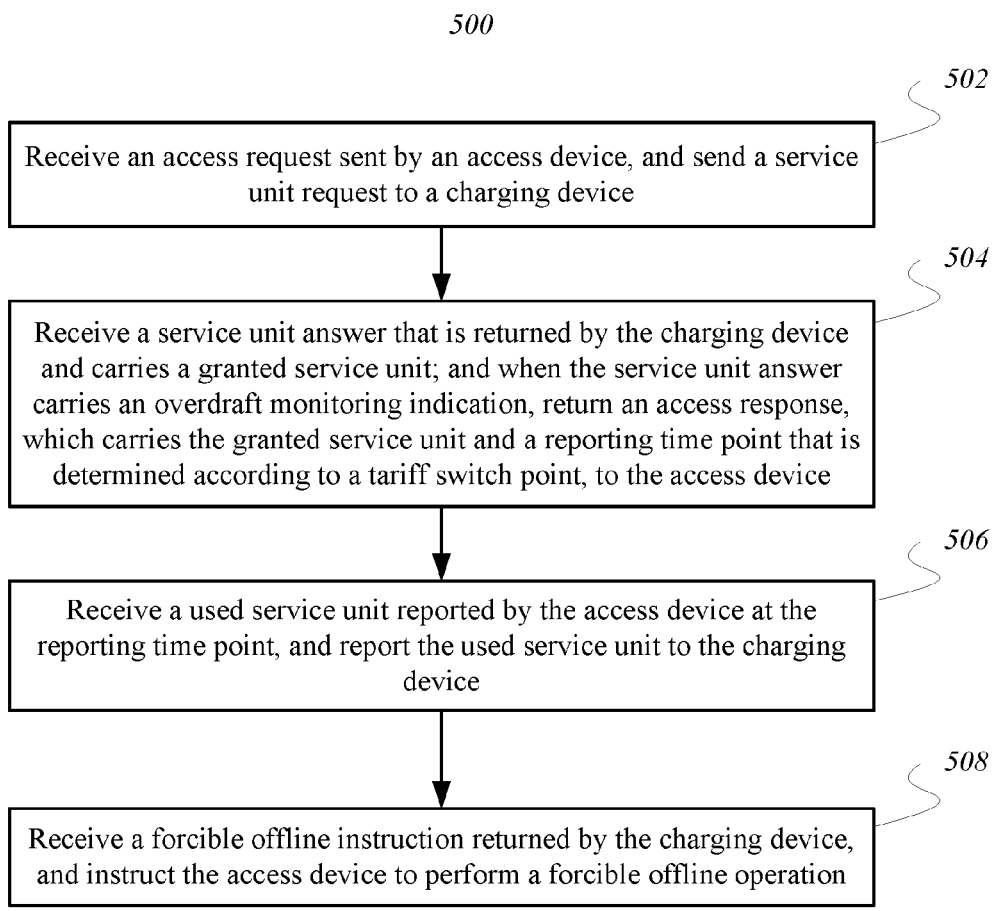
FIG. 5 is an exemplary flowchart of an authentication method according to an embodiment of the present disclosure.

FIG. 5 is an exemplary flowchart of an authentication method 500 according to an embodiment of the present disclosure. In a specific implementation process, the authentication method 500 may be executed by, such as, but not limited to, an authentication device. The foregoing authentication device may be, such as, but not limited to, an AAA server.

Step 502: Receive an access request sent by an access device, and send a service unit request to a charging device.

Step 504: Receive a service unit answer that is returned by the charging device and carries a granted service unit; and when the service unit answer carries an overdraft monitoring indication, return an access response, which carries the granted service unit and a reporting time point that is determined according to a tariff switch point, to the access device.

In a specific implementation process, the overdraft monitoring indication is the reporting time point determined according to the tariff switch point. In view of that, the reporting time point is determined by the charging device.

Optionally, the returning an access response, which carries the granted service unit and a reporting time point that determined according to a tariff switch point, to the access device includes: determining the reporting time point according to the tariff switch point; and returning the access response, which carries the granted service unit and the reporting time point, to the access device. In view of that, the reporting time point is determined by the authentication device.

In a specific implementation process, the foregoing reporting time point may be the tariff switch point. Therefore, when determining the reporting time point according to the tariff switch point, the charging device or the authentication device may assign the tariff switch point to the reporting time point.

Optionally, the charging device or the authentication device may further determine the reporting time point using the following method: calculating a delay duration; and calculating the reporting time point according to the following formula: Reporting time point=Tariff switch point+Delay duration.

Step 506: Receive a used service unit reported by the access device at the reporting time point, and report the used service unit to the charging device.

Step 508: Receive a forcible offline instruction returned by the charging device, and instruct the access device to perform a forcible offline operation.

Figure 6:
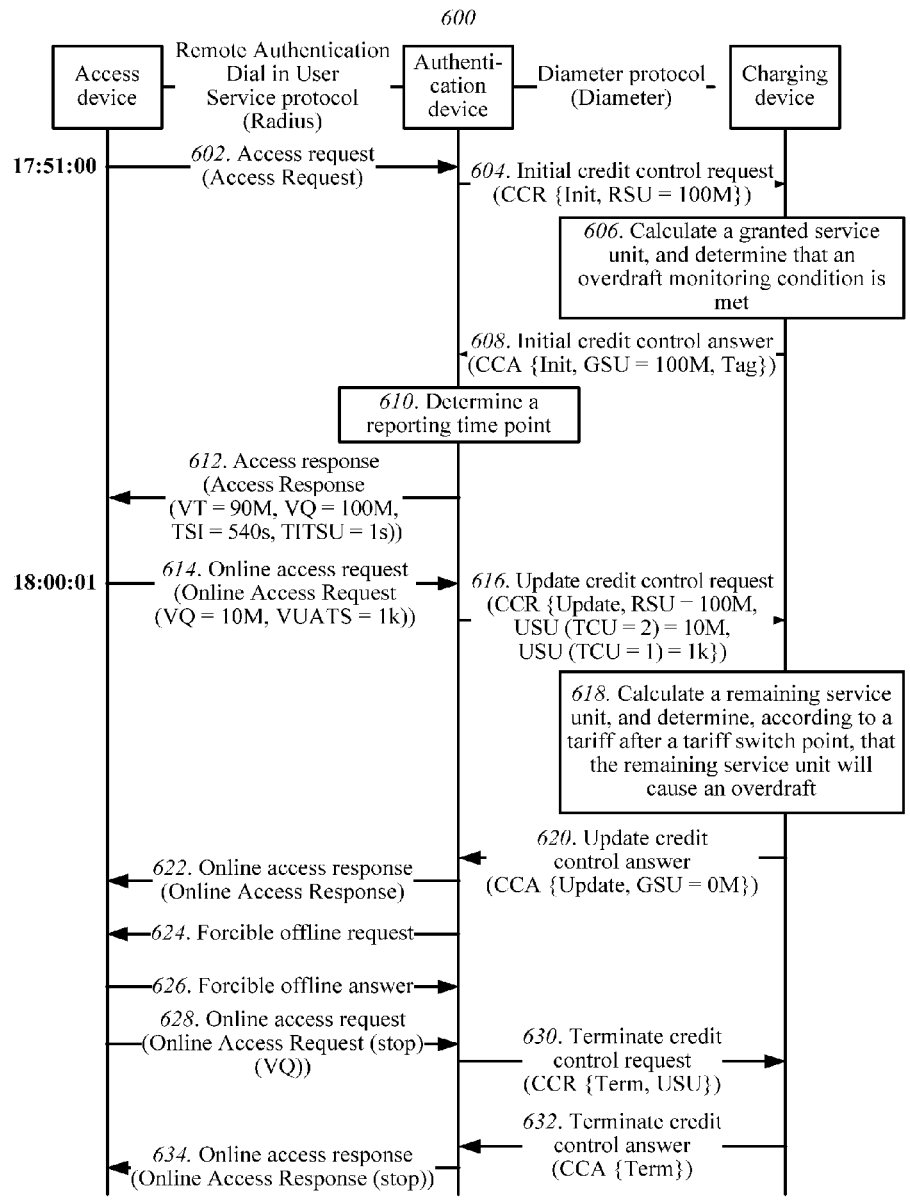
FIG. 6 is an exemplary signaling diagram of a charging method according to an embodiment of the present disclosure.

FIG. 6 is an exemplary signaling diagram of a charging method 600 according to an embodiment of the present disclosure. In the embodiment, an access device communicates with an authentication device according to the Remote Authentication Dial in User Service (Radius) protocol, and the authentication device communicates with a charging device according to the Diameter protocol. In addition, in the embodiment, 18 o'clock is a tariff switch point. That is, a tariff is switched at 18 o'clock, where a tariff before the switch is 0 yuan/M, that is, no fee is charged before the switch, and a tariff after the switch is 1 yuan/M. In the embodiment, an overdraft monitoring condition is: Tariff after the tariff switch point×Granted service unit>Current account balance. In addition, in the embodiment, a reporting time point is calculated using a solution of calculating a delay duration and using a formula: Reporting time point=Tariff switch point+Delay duration.

A user sends a login request to the access device at seventeen fifty-one, namely, 17:51:00, and a user account balance is 10 yuan at this time.

Step 602: The access device sends an access request to the authentication device according to the login request of the user. The access request is the access request described in step 502 in FIG. 5.

Step 604: The authentication device sends a CCR {Init} to the charging device according to the received access request, where the initial credit control request carries a RSU of 100 M. The initial credit control request is the service unit request in step 502 in FIG. 5.

Step 606: The charging device determines a granted service unit according to a current account balance of the user and a current tariff. Because the current account balance of the user is 10 yuan and the current tariff is 0 yuan/M, a current available service unit is infinite. That is, the user may use a service unrestrictedly until the end of a free time segment. As described above, in this case, the granted service unit is set to be the service unit requested by the access device, namely, the RSU of 100 M carried in the initial credit control request.

After the granted service unit is determined, in step 606, the charging device continues to determine whether the overdraft monitoring condition is met. As described above, in the embodiment, the overdraft monitoring condition is: Tariff after the tariff switch point×Granted service unit>Current account balance. Because the tariff after the tariff switch point is 1 yuan/M and the granted service unit is 100 M, a product of the tariff after the tariff switch point and the granted service unit is equal to 100 yuan, which is far more than the current account balance of 10 yuan. Therefore, the charging device determines that the overdraft monitoring condition is met.

Step 608: The charging device sends a CCA {Init} to the authentication device. The initial credit control answer carries the GSU of 100 M. In addition, the initial credit control answer further carries a tag, where the tag is used as an overdraft monitoring indication. The initial credit control answer is the service unit request in step 504 in FIG. 5.

Step 610: The authentication device receives the initial credit control answer returned by the charging device, and determines a reporting time point when determining that the initial credit control answer carries the tag used as the overdraft monitoring indication. As described above, in the embodiment, the reporting time point is calculated using a solution of calculating a delay duration and using a formula: Reporting time point=Tariff switch point+Delay duration. In this case, it is assumed that a delay duration calculated using a random algorithm is one second, and therefore the reporting time point determined by the charging device is 18:00:01.

Step 612: The authentication device returns an access response to the access device, so that the access device authorizes the user to use a service and monitors a used service unit of the user. The access response carries parameters VT=90 M and VQ=100 M, where VQ=100 M indicates that the granted service unit is 100 M, and VT=90 M indicates that the access device needs to request a granted service unit again for the user after detecting that the used service unit of the user reaches 90 M. In addition, the access response further includes a TSI, which is used to indicate a time interval between a current moment and the tariff switch point, so as to prompt the access device to separately report used service units which are generated before and after the tariff switch point, respectively. TSI=540 s indicates that the interval between the current moment and the tariff switch point (a time loss in a process of transferring and processing a message is ignored) is 540 seconds.

In addition, the foregoing access response further carries an important parameter, namely, a next tariff switch point after the TSI (Time Interval After Tariff Switch Update, TITSU). According to existing technical specifications related to real-time charging, the access device must report a used service unit at a moment indicated by the TITSU and request a granted service unit for the user. The authentication device indicates the reporting time points to the access device using the two parameters TSI and TITSU. In the embodiment, the TITSU is set to one second, namely, the delay duration calculated by the authentication device. The authentication device sets the TITSU parameter to one second, so as to instruct the access device to report the used service unit at one second (TITSU=1) after the tariff switch point (the time interval between the current moment and the tariff switch point is indicated by the TSI parameter).

The access response is the access response in step 504 in FIG. 5.

Step 614: When the access device authorizes the user to use a service and detects that one second after the tariff switch point of 18 o'clock, namely, 18:00:01, is reached, the access device reports an online access request, where the online access request carries a used service unit of 10 M (the used service unit is also carried in the VQ, and indicates that a used service unit after the tariff switch point of 18 o'clock is 1 k in the used service unit of 10 M, that is, a volume used after tariff switch (VUATS) is 1 k.

Step 616: After receiving the online access request from the access device, the authentication device notifies the charging device of the foregoing used service units using a CCR {Update}, where the foregoing used service units are carried in a USU field. Because the tariff is switched, according to existing technical specifications related to real-time charging, the authentication device reports two USUs simultaneously, where a USU (TCU=2) represents a total used service unit, namely, 10 M, in a last charging period, and a USU (TCU=1) represents the used service unit after the tariff switch, namely, 1 k, in the latest charging period. In addition, the update credit control request still carries the RSU of 100 M.

Step 618: After receiving the update credit control request from the authentication device, the charging device calculates and obtains a remaining service unit of 90 M (100 M−10 M) according to the previous granted service unit of 100 M and the used service unit of 10 M that is reported by the access device.

In addition, the charging device performs charging according to the used service units carried in the CCR {Update}. Further, a used service unit generated before 18 o'clock is 10 M−1 k, and a fee of 0 yuan is generated according to the tariff of 0 yuan/M before 18 o'clock; a service unit generated after 18 o'clock is 1 k, a fee of $1/1024$ yuan is generated according to the tariff of 1 yuan/M after 18 o'clock, and therefore a user account balance after fee deduction is 10−1/1024 yuan, which is about 10 yuan.

Then, according to the remaining service unit, the user account balance after fee deduction, and the current tariff, the charging device determines whether the remaining service unit will cause an overdraft. Because the remaining service unit is 90 M and the current tariff is 1 yuan/M, the user needs to pay 90 yuan (90 M×1 yuan/M) in total for using all the remaining service unit, and 90 yuan is far more than the user account balance after fee deduction (about 10 yuan). Therefore, the charging device determines that the remaining service unit will cause an overdraft.

Step 620: The charging device returns a CCA {Update} to the authentication device, where a carried GSU is 0 M. The charging device sets the GSU to 0 to instruct the authentication device to instruct the access device to perform a forcible offline operation. That is, GSU=0 is used as a forcible offline instruction.

Step 622: The authentication device returns an online access response to the access device according to the update credit control answer sent by the charging device, and indicates to the access device in the online access response, that the granted service unit is zero.

Step 624: To prevent the access device from permitting the user to continue using the remaining service unit of 90 M, the authentication device sends a forcible offline request to the access device, so as to instruct the access device to force the user to go offline. In the embodiment, the forcible offline request is a disconnect messages request (DM-REQ).

Step 626: According to the forcible offline request from the authentication device, the access device forces the user to go offline, and then returns a forcible offline answer to the authentication device, which notifies the authentication device that the user has been forced to go offline. In the embodiment, the forcible offline answer is a disconnect messages acknowledge (DM-ACK).

The user still uses a service during a process from step 614 in which the access device reports the used service units to step 626 in which the access device forces the user to go offline, and therefore a used service unit is generated inevitably. Although this used service unit is small, it is still necessary to charge for this used service unit. Therefore, in step 628, the access device reports a stop online access request (Online Access Request (stop)) to the authentication device, and reports the used service unit, where the used service unit is carried in the VQ parameter.

Step 630: The authentication device reports a CCR {Term} to the charging device according to the stop online access request from the access device, and where the used service unit is carried in the USU parameter.

Step 632: The charging device performs fee deduction for the user account according to the used service unit carried in the terminate credit control request sent by the authentication device, and then returns a CCA {Term} to the authentication device.

Step 634: The authentication device returns a stop online access response (Online Access Response (stop)) to the access device according to the terminate credit control answer from the charging device.

Figure 7:
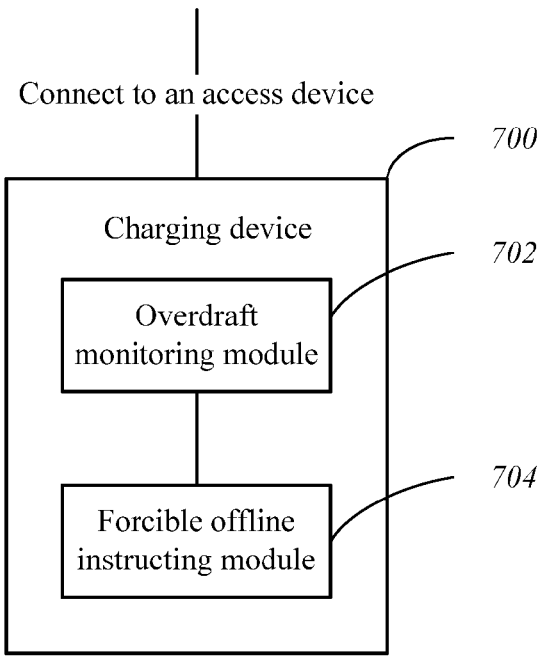
FIG. 7 is a schematic diagram of a logical structure of a charging device according to an embodiment of the present disclosure.

FIG. 7 is a schematic diagram of a logical structure of a charging device 700 according to an embodiment of the present disclosure. The charging device 700 is connected to an access device. As shown in FIG. 7, the charging device 700 includes an overdraft monitoring module 702 and a forcible offline instructing module 704.

The overdraft monitoring module 702 is configured to receive a service unit request sent by the access device; calculate a granted service unit according to a current tariff; determine a reporting time point according to a tariff switch point when an overdraft monitoring condition is met according to the granted service unit and a tariff after the tariff switch point; and return a service unit answer, which carries the granted service unit and the reporting time point, to the access device.

In a specific implementation process, the overdraft monitoring condition is at least one of the following conditions.

Tariff after the tariff switch point×Granted service unit>Current account balance; and (Granted service unit−Preset maximum access speed×Time interval between a current moment and the tariff switch point)×Tariff after the tariff switch point+Preset maximum access speed×Time interval between the current moment and the tariff switch point×Current tariff>Current account balance.

Optionally, the overdraft monitoring condition is that a tariff before the tariff switch point is lower than the tariff after the tariff switch point.

In a specific implementation process, when the reporting time point is determined according to the tariff switch point, the overdraft monitoring module 702 is configured to assign the tariff switch point to the reporting time point.

Optionally, in a specific implementation process, when the reporting time point is determined according to the tariff switch point, the overdraft monitoring module 702 is configured to calculate a delay duration; and calculate the reporting time point according to the following formula: Reporting time point=Tariff switch point+Delay duration.

The forcible offline instructing module 704 is configured to receive a used service unit reported by the access device at the reporting time point; calculate a remaining service unit based on the granted service unit and the used service unit; and when the remaining service unit will cause an overdraft, instruct the access device to perform a forcible offline operation.

In a specific implementation process, when the used service unit reported by the access device is received, the forcible offline instructing module 704 may first perform fee deduction for a user account according to the used service unit. Then, if a product of the tariff after the tariff switch point and the remaining service unit exceeds a user account balance after fee deduction, it indicates that the user account will be overdrawn after a user uses up the remaining service unit. In this case, when determining that the remaining service unit will cause an overdraft, the forcible offline instructing module 704 instructs the access device to perform the forcible offline operation, so as to prevent the user account from being overdrawn.

It should be noted that, in a specific implementation process, the charging device 700 further includes a necessary hardware module such as a processor and a transceiver. The operations of the foregoing modules should be viewed as operations which the processor and/or the transceiver implement according to corresponding instructions received from the modules. In this way, the overdraft monitoring module 702 is configured to use the transceiver to receive the service unit request sent by the access device; use the processor to calculate the granted service unit according to the current tariff, and to determine the reporting time point according to the tariff switch point when the overdraft monitoring condition is met according to the granted service unit and the tariff after the tariff switch point; and use the transceiver to return the service unit answer, which carries the granted service unit and the reporting time point, to the access device. The forcible offline instructing module 704 is configured to use the transceiver to receive the used service unit reported by the access device at the reporting time point; use the processor to calculate the remaining service unit based on the granted service unit and the used service unit; and when it is determined, using the processor, that the remaining service unit will cause an overdraft, use the transceiver to instruct the access device to perform the forcible offline operation.

Figure 8:
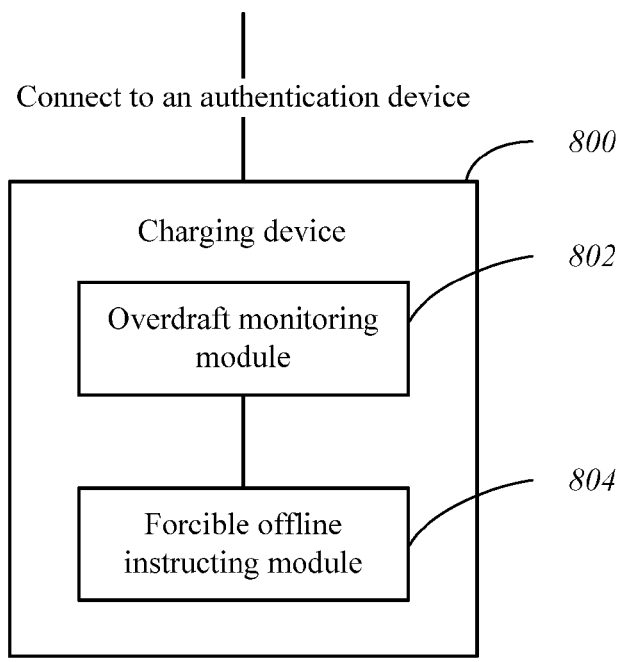
FIG. 8 is a schematic diagram of a logical structure of a charging device according to an embodiment of the present disclosure.

FIG. 8 is a schematic diagram of a logical structure of a charging device 800 according to an embodiment of the present disclosure. The charging device 800 is connected to an authentication device. As shown in FIG. 8, the charging device 800 includes an overdraft monitoring module 802 and a forcible offline instructing module 804.

The overdraft monitoring module 802 is configured to receive a service unit request sent by an access device through the authentication device; calculate a granted service unit according to a current tariff; and when an overdraft monitoring condition is met according to the granted service unit and a tariff after a tariff switch point, return a service unit answer, which carries the granted service unit and a reporting time point that is determined according to the tariff switch point, to the access device through the authentication device.

When the service unit answer, which carries the granted service unit and the reporting time point that is determined according to the tariff switch point, is returned to the access device through the authentication device, the overdraft monitoring module 802 is configured to determine the reporting time point according to the tariff switch point; and return the service unit answer, which carries the granted service unit and the reporting time point, to the access device through the authentication device. In a specific implementation process, when the reporting time point is determined according to the tariff switch point, the overdraft monitoring module 802 is configured to assign the tariff switch point to the reporting time point. Optionally, in a specific implementation process, when the reporting time point is determined according to the tariff switch point, the overdraft monitoring module 802 is configured to calculate a delay duration; and calculate the reporting time point according to the following formula: Reporting time point=Tariff switch point+Delay duration.

Optionally, when the service unit answer, which carries the granted service unit and the reporting time point that is determined according to the tariff switch point, is returned to the access device through the authentication device, the overdraft monitoring module 802 is configured to instruct the authentication device to determine the reporting time point according to the tariff switch point; and instruct the authentication device to return the service unit answer, which carries the granted service unit and the reporting time point, to the access device. It is not hard to understand that the reporting time point is determined by the authentication device in this case.

The forcible offline instructing module 804 is configured to receive a used service unit reported by the access device through the authentication device at the reporting time point; calculate a remaining service unit based on the granted service unit and the used service unit; and when the remaining service unit will cause an overdraft, instruct, through the authentication device, the access device to perform a forcible offline operation.

It should be noted that, in a specific implementation process, the charging device 800 further includes a necessary hardware module such as a processor and a transceiver. The operations of the foregoing modules should be viewed as operations which the processor and/or the transceiver implement according to corresponding instructions received from the modules. In this way, the overdraft monitoring module 802 is configured to use the transceiver to receive the service unit request sent by the access device through the authentication device; use the processor to calculate the granted service unit according to the current tariff; and when it is determined, using the processor, that the overdraft monitoring condition is met according to the granted service unit and the tariff after the tariff switch point, use the transceiver to return the service unit answer, which carries the granted service unit and the reporting time point that is determined according to the tariff switch point, to the access device through the authentication device. The forcible offline instructing module 804 is configured to use the transceiver to receive the used service unit reported by the access device through the authentication device at the reporting time point; use the processor to calculate the remaining service unit based on the granted service unit and the used service unit; and when it is determined, by the processor, that the remaining service unit will cause an overdraft, use the transceiver to instruct, through the authentication device, the access device to perform the forcible offline operation.

Figure 9:
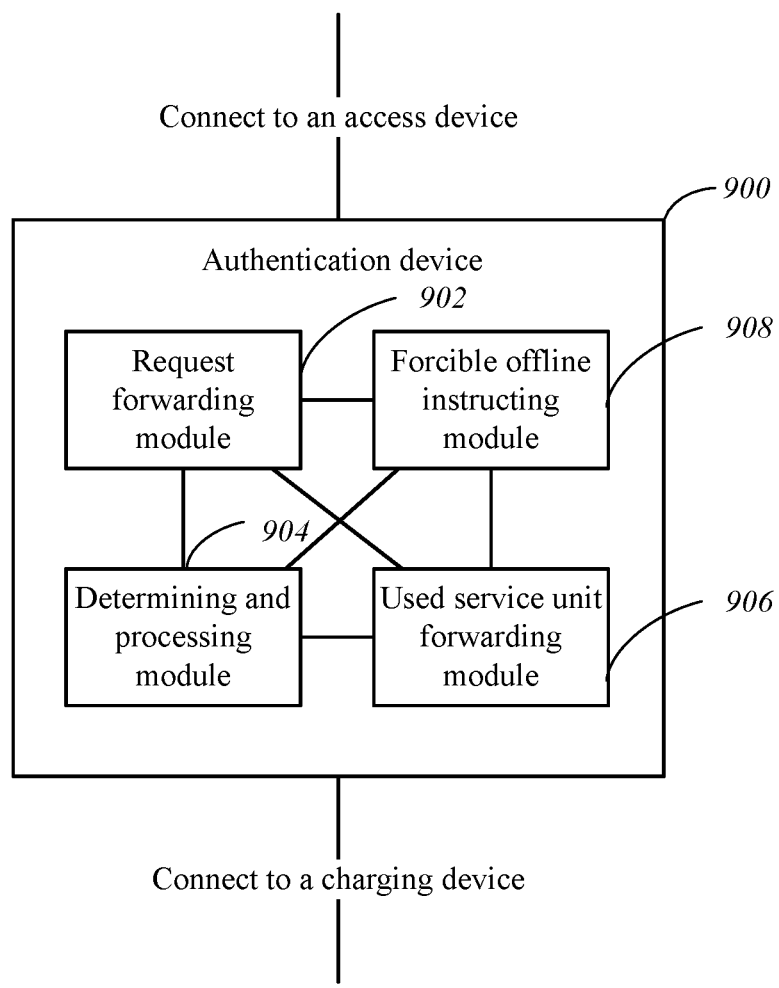
FIG. 9 is a schematic diagram of a logical structure of an authentication device according to an embodiment of the present disclosure.

FIG. 9 is a schematic diagram of a logical structure of an authentication device 900 according to an embodiment of the present disclosure. The authentication device 900 is connected to an access device and a charging device separately. As shown in FIG. 9, the authentication device 900 includes a request forwarding module 902, a determining and processing module 904, a used service unit forwarding module 906, and a forcible offline instructing module 908.

The request forwarding module 902 is configured to receive an access request sent by the access device, and send a service unit request to the charging device.

The determining and processing module 904 is configured to receive a service unit answer that is returned by the charging device and carries a granted service unit; and when the service unit answer carries an overdraft monitoring indication, return an access response, which carries the granted service unit and a reporting time point that is determined according to a tariff switch point, to the access device.

In a specific implementation process, the overdraft monitoring indication is the reporting time point determined by the charging device according to the tariff switch point. In this case, the reporting time point is determined by the charging device.

Optionally, in a specific implementation process, when the access response, which carries the granted service unit and the reporting time point that is determined according to the tariff switch point, is returned to the access device, the determining and processing module 904 is configured to determine the reporting time point according to the tariff switch point; and return the access response, which carries the granted service unit and the reporting time point, to the access device.

In a specific implementation process, when the reporting time point is determined according to the tariff switch point, the determining and processing module 904 is configured to assign the tariff switch point to the reporting time point.

Optionally, in a specific implementation process, when the reporting time point is determined according to the tariff switch point, the determining and processing module 904 is configured to calculate a delay duration; and calculate the reporting time point according to the following formula: Reporting time point=Tariff switch point+Delay duration.

The used service unit forwarding module 906 is configured to receive a used service unit reported by the access device at the reporting time point, and report the used service unit to the charging device.

The forcible offline instructing module 908 is configured to receive a forcible offline instruction returned by the charging device, and instruct the access device to perform a forcible offline operation.

It should be noted that, in a specific implementation process, the authentication device 900 further includes a necessary hardware module such as a processor and a transceiver. The operations of the foregoing modules should be viewed as operations which the processor and/or the transceiver implement according to corresponding instructions received from the modules. In this way, the request forwarding module 902 is configured to use the transceiver to receive the access request sent by the access device, and to send the service unit request to the charging device; the determining and processing module 904 is configured to use the transceiver to receive the service unit answer that is returned by the charging device and carries the granted service unit, and when it is determined, using the processor, that the service unit answer carries the overdraft monitoring indication, use the transceiver to return the access response, which carries the granted service unit and the reporting time point that is determined according to the tariff switch point, to the access device; the used service unit forwarding module 906 is configured to use the transceiver to receive the used service unit reported by the access device at the reporting time point, and to report the used service unit to the charging device; and the forcible offline instructing module 908 is configured to use the transceiver to receive the forcible offline instruction returned by the charging device, and to instruct the access device to perform the forcible offline operation.

A person of ordinary skill in the art may understand that all or a part of the steps of the foregoing methods may be implemented by a program instructing relevant hardware. The program may be stored in a computer readable storage medium. The storage medium includes: a read only memory (ROM), a random access memory (RAM), and an optical disc.

To sum up, the foregoing descriptions are merely exemplary embodiments of the present disclosure, but are not intended to limit the protection scope of the present disclosure. Any modification, equivalent replacement, and improvement made without departing from the spirit and principle of the present disclosure shall fall within the protection scope of the present disclosure.

What is claimed is:

1. A charging device, comprising:
   a storage device storing computer executable program codes;
   a processor, coupled with the storage device, wherein the program codes comprise instructions which, when executed by the processor, cause the processor to:
   receive a service unit request sent by an access device;
   determine a granted service unit according to a current tariff;
   determine a reporting time point according to a tariff switch point when an overdraft monitoring condition is met according to the granted service unit and a tariff after the tariff switch point;
   return a service unit answer to the access device, wherein the service unit answer carries the granted service unit and the reporting time point;
   receive a used service unit reported by the access device at the reporting time point;
   calculate a remaining service unit based on the granted service unit and the used service unit; and
   instruct the access device to perform a forcible offline operation when the remaining service unit will cause an overdraft.

2. The device according to claim 1, wherein the overdraft monitoring condition is:
Tariff after the tariff switch point×Granted service unit>Current account balance.

3. The device according to claim 1, wherein the overdraft monitoring condition is:
(Granted service unit−Preset maximum access speed×Time interval between a current moment and the tariff switch point)×Tariff after the tariff switch point+Preset maximum access speed×Time interval between the current moment and the tariff switch point×Current tariff>Current account balance.

4. The device according to claim 1, wherein when the reporting time point is determined according to the tariff switch point, and wherein the processor is caused to assign the tariff switch point to the reporting time point.

5. The device according to claim 1, wherein when the reporting time point is determined according to the tariff switch point, and wherein the processor is caused to:
   calculate a delay duration; and
   calculate the reporting time point according to the following formula: Reporting time point=Tariff switch point+Delay duration.

6. A charging device, comprising:
   a storage device storing computer executable program codes;
   a processor, coupled with the storage device, wherein the program codes comprise instructions which, when executed by the processor, cause the processor to:
   receive a service unit request sent by an access device through an authentication device;
   calculate a granted service unit according to a current tariff;
   return a service unit answer to the access device through the authentication device when an overdraft monitoring condition is met according to the granted service unit and a tariff after a tariff switch point, wherein the service unit answer carries the granted service unit and a reporting time point that is determined according to the tariff switch point;
   receive a used service unit reported by the access device through the authentication device at the reporting time point;
   calculate a remaining service unit based on the granted service unit and the used service unit; and
   instruct, through the authentication device, the access device to perform a forcible offline operation when the remaining service unit will cause an overdraft.

7. The device according to claim 6, wherein when the service unit answer is returned to the access device through the authentication device, the processor is caused to:
   determine the reporting time point according to the tariff switch point; and
   return the service unit answer, which carries the granted service unit and the reporting time point, to the access device through the authentication device.

8. The device according to claim 6, wherein when the service unit answer is returned to the access device through the authentication device, the processor is caused to:

instruct the authentication device to determine the reporting time point according to the tariff switch point; and
instruct the authentication device to return the service unit answer, which carries the granted service unit and the reporting time point, to the access device.

9. An authentication device, comprising:
a storage device storing computer executable program codes;
a processor, coupled with the storage device, wherein the program codes comprise instructions which, when executed by the processor, cause the processor to:
receive an access request sent by an access device, and send a service unit request to a charging device;
receive a service unit answer that is returned by the charging device and carries a granted service unit;
return an access response to the access device when the service unit answer carries an overdraft monitoring indication, wherein the access response carries the granted service unit and a reporting time point that is determined according to a tariff switch point;
receive a used service unit reported by the access device at the reporting time point, and report the used service unit to the charging device; and
receive a forcible offline instruction returned by the charging device, and instruct the access device to perform a forcible offline operation.

10. The device according to claim 9, wherein the overdraft monitoring indication is the reporting time point determined according to the tariff switch point.

11. The device according to claim 9, wherein when the access response is returned to the access device, the processor is caused to:
determine the reporting time point according to the tariff switch point; and
return the access response, which carries the granted service unit and the reporting time point, to the access device.

* * * * *